United States Patent
Bangarambandi et al.

(10) Patent No.: US 9,922,028 B2
(45) Date of Patent: Mar. 20, 2018

(54) SYSTEM AND METHOD FOR TRANSLATION AND LOCALIZATION OF CONTENT IN DIGITAL APPLICATIONS

(71) Applicant: OSLABS PTE. LTD., Singapore (SG)

(72) Inventors: Sudhir Bangarambandi, Mumbai (IN); Rakesh Deshmukh, Indore (IN); Preeti Saluja, Bangalore (IN)

(73) Assignee: OSLABS PTE. LTD., Singapore (SG)

( * ) Notice: Subject to any disclaimer, the term of this patent is extended or adjusted under 35 U.S.C. 154(b) by 0 days.

(21) Appl. No.: 15/266,985

(22) Filed: Sep. 15, 2016

(65) Prior Publication Data

US 2017/0083512 A1  Mar. 23, 2017

(30) Foreign Application Priority Data

Sep. 17, 2015  (IN) .......................... 3105/MUM/2015

(51) Int. Cl.
*G06F 17/28* (2006.01)
*G06F 9/445* (2018.01)

(52) U.S. Cl.
CPC ............ *G06F 17/2836* (2013.01); *G06F 8/61* (2013.01); *G06F 17/2818* (2013.01)

(58) Field of Classification Search
USPC ....................................................... 704/1–10
See application file for complete search history.

(56) References Cited

U.S. PATENT DOCUMENTS

| | | | | |
|---|---|---|---|---|
| 7,653,528 B2* | 1/2010 | Kohlmeier | ............ | G06F 9/4448 704/2 |
| 2012/0016655 A1* | 1/2012 | Travieso | ............. | G06F 17/2827 704/2 |
| 2012/0089898 A1* | 4/2012 | Aue | ..................... | G06F 17/2827 715/234 |
| 2013/0144596 A1* | 6/2013 | Lui | ...................... | G06F 17/2705 704/2 |
| 2013/0226555 A1* | 8/2013 | Lerum | .................. | G06F 9/4448 704/2 |
| 2014/0372098 A1* | 12/2014 | Arseniev | ............... | G06F 17/289 704/2 |

* cited by examiner

*Primary Examiner* — Abul Azad
(74) *Attorney, Agent, or Firm* — Barry Choobin; Patent 360 LLC

(57) ABSTRACT

The embodiments herein provide a system and method for translation of static and dynamic. content in digital applications. The embodiments provide a system and method for contextual translation of static and dynamic content on digital applications based on user-defined triggers. Currently available methods are pre-configured for content that is already part of the application, the applications do not localize or translate dynamically generated content. The present embodiments provide a system for contextual translation of static and dynamic content on digital applications. The system enables localization of multiple aspects of digital content, such as static and dynamic content, language, push notifications etc. based on multiple user-defined triggers such as history of user preferences, usage pattern of the user, input method, location of user etc. The system also provides a rank-based priority for localization of content based on analyses of usage pattern.

5 Claims, 2 Drawing Sheets

SYSTEM AND METHOD FOR TRANSLATION AND LOCALIZATION OF CONTENT IN DIGITAL APPLICATIONS

CROSS-REFERENCE TO RELATED APPLICATION

This application claims the priority of the Indian Provisional Patent Application with serial number 3105/MUM/2015 filed on Aug. 17, 2015 and subsequently post-dated by one month to Sep. 17, 2015 with the title "SYSTEM AND METHOD FOR AUTOMATIC TRANSLATION AND LOCALIZATION OF CONTENT IN DIGITAL APPLICATIONS", and the contents of which is incorporated in entirety as reference herein.

BACKGROUND

Technical Field

The embodiments herein are generally related to translation of content in digital applications. The embodiments herein are particularly related to translation of static and dynamic content in digital applications. The embodiments herein are more particularly related to a system and method for contextual translation of static and dynamic content on digital applications based on pre-defined triggers.

Description of the Related Art

Translation of digital content is very widely used in the interne browsers of computing devices. With widespread use of computing devices across multiple geographic locations, the need for translation of content from one language to another language is increasing with every passing day. Current methods translate the content on a webpage into a different language. Other translation methods are provided on social networking websites, where user-triggered translation of content is enabled.

Currently used localization frameworks on various computing platforms provide a mechanism to add new languages without changing the core code of the application software. However, no support is provided to the end user with respect to the actual localization process and only the developer of the application is enabled to take all the necessary steps needed to achieve the localization of the application. The user who is the actual demander of localized content has no say on the localized content and is not enabled to request for the localized application in real-time.

Hence, there is a need for a system for contextual translation of static and dynamic content on digital applications. There is also a need for tools and mechanisms to ease the process of localization and enable translation of content based on user-defined triggers.

The abovementioned shortcomings, disadvantages and problems are addressed herein and which will be understood by reading and studying the following specification.

OBJECT OF THE EMBODIMENTS HEREIN

The primary object of the embodiments herein is to provide a system and method for translation of static and dynamic content in a digital application.

Another object of the embodiments herein is to provide a system and method for and contextual translation of static and dynamic content on a digital application based on user-defined triggers.

Another object of the embodiments herein is to provide a system and method for localization of a digital application available on application store to enable translation of static and dynamic content.

Yet another object of the embodiments herein is to enable localization of dynamic and static content in any application installed on a computing device.

Yet another object of the embodiments herein is to provide a method to trigger localization of content within an application based on input method used by the user.

Yet another object of the embodiments herein is to enable localization of static and dynamic content of an application based on previously localized other versions of the same application depending on the activation of a trigger.

Yet another object of the embodiments herein is to enable the identification of input methods and prompts that trigger the localization of content.

Yet another object of the embodiments herein is to enable the localization of multiple aspects of digital content such as static and dynamic content, language, push notifications etc.

Yet another object of the embodiments herein is to enable the localization of digital content based on multiple triggers such as history of user preferences, usage pattern of the user, input method, location of user etc.

Yet another object of the embodiments herein is to enable the localization of digital content based on a ranking system that identifies a rank-based priority for localization of content based on usage pattern and information from user profile.

Yet another object of the embodiments herein is to enable a translator to use a localization tool on a computing device to translate digital applications and verify translation of digital content of an application submitted by another translator.

These and other objects and advantages of the embodiments herein will become readily apparent flora the following summary and the detailed description taken in conjunction with the accompanying drawings.

SUMMARY

The following details present a simplified summary of the embodiments herein to provide a basic understanding of the several aspects of the embodiments herein. This summary is not an extensive overview of the embodiments herein. It is not intended to identify key/critical elements of the embodiments herein or to delineate the scope of the embodiments herein. Its sole purpose is to present the concepts of the embodiments herein in a simplified form as a prelude to the more detailed description that is presented later.

The other objects and advantages of the embodiments herein will become readily apparent from the following description taken in conjunction with the accompanying drawings.

The various embodiments herein provide a system and method for translation of static and dynamic content in digital applications. The embodiments also provide a system. and method for contextual translation of static and dynamic content on digital applications based on user-defined triggers.

According to one embodiment herein, a system and method is provided to identify content for localization. The embodiment enables localization of dynamic and static content of any application installed on a computing device. The embodiment also enables a method to trigger localization of content within an application based on input method used by the user. The localization of static and dynamic content of multiple versions of a same application is also enabled depending on activation of preset user-defined triggers. The dynamic content includes dynamic strings that are generated during runtime by an application. The embodiment also enables localization of any string or content displayed on the computing device.

According to one embodiment herein, a localization engine is provided to localize content in digital applications. The localization engine is present on a computing device, on a server or as a distributed system that is present in parts on the device of a user and remaining parts on a server. The localization engine caches the commonly translated string on the device and stores information on a server. The localization is enabled to be performed in a single step or in multiple steps, where each step comprises only a part of the strings that are localized. In the case of dynamic strings, the localization is a continuous process that runs on the application.

According to one embodiment herein, a localization engine is provided for localization of digital content and enabling translation of content. The localization engine performs and manages all translations performed by the system. When a translation request is obtained at the localization engine, the translation is performed and the translated content is returned to the communication module that requested the translation. The communication module that request for translation are an application localization tool, an application store and a computing device. The application localization tool is a standalone tool that runs on a computing device and enables developers to localize their applications into specific languages. The application store server sends a localization request when the application store comprises applications that include content that is localized after the content is uploaded on the application. The device that runs the localization engine sends a localization request to the localization engine when the device runs an application that is set to a language, which is not a part of the localized strings comprised in the application. The localization engine comprises a human translation management module and an automated translation module. In the Automated Translation module fed test is translated automatically using a statistical machine learning module, which continuously improve automated translations by learning from the correct translations fed into it.

According to one embodiment herein, a method for identifying a plurality of triggers is provided to enable localization of digital content. The embodiment enables a computing device to identify triggers such as input methods, location of user, language of device etc., to activate a trigger for localization. Localization is not limited to localization of content and language, but includes services such as push notifications by applications and updates. Once a trigger is activated, all types of content such as dynamic, static, user generated etc, are localized and the system continues to localize content until another trigger is activated. Triggers also include displaying content or string that does not match the user's locale. The recognition of a trigger is enabled during not only the installation of an application, but also whenever a new localizable content is available in the application.

According to one embodiment herein, a method to identify a plurality of triggers for localization digital content based on preset user-defined rules is provided. The multiple triggers that enable localization of data include triggers such as history of user preferences, usage pattern of the user, input method, location of user etc. The embodiment also provides a ranking system that identifies a rank-based priority for localization of content based on usage pattern and information from user profile.

According to one embodiment herein, a system that enables localization of digital content in computing devices is provided. The system comprises a Hardware Processor, a Memory, Application Store, Application, Device, Triggers, a Communication module and Localization Engine. An Application is retrieved from Application Store and installed in a computing Device. Preset Triggers are provided to the Device to determine when localization is to be done for translation of content in the Application. The Application transmits Localizable strings for Applications to the Localization Engine. The Localization Engine then transmits Translated and localized strings for Applications to the Application, to enable localization of content in the Device. The Communication module communicates the trigger information to the localization engine when a request for translation is made.

According to one embodiment herein, a method for localization of digital content in an application is provided. The process comprises following steps: Installation of application; Check when triggers for localization are available; when triggers are available, send message to the localization engine; when triggers are not available, then detect triggers; prompt the application about detected triggers; Check when any localized strings are available; when localized strings are not available, send message to localization engine; when localized strings are available, then prompt the localization engine and send strings; and, send notification along with translated or localized strings to application.

According to one embodiment herein, localization is enabled for an application installed on a computing device based on demand of the user. The application that is present in an application store or the localization tool enables a developer to localize application prior to uploading an application to the application store. Further, the localization engine manages versions of the application. When a translation is available to the application, the translation is provided to the user requesting for the translation. When translation is available for a past version of the application, a string is compared with the past and the present versions, and localization is provided based on the comparison.

According to one embodiment herein, an automated translation module is provided. The automated translation module is based on a statistical machine learning translation engine. The statistical machine learning translation engine generates translations on the basis of statistical models. A plurality of parameters for the translation is derived from an analysis of bilingual text corpora for every language pair of source language and target language of a translation. The statistical machine learning translation engine is initially loaded with a large corpora for a plurality of languages. When a new translation is performed through the human translation management system, the translated content is added into the appropriate language corpus. The statistical machine learning translation engine uses all the corpora to perform automated translations of any input text.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The other objects, features and advantages will occur to those skilled in the art from the following description of the preferred embodiment and the accompanying drawings in which.

Figure 1:
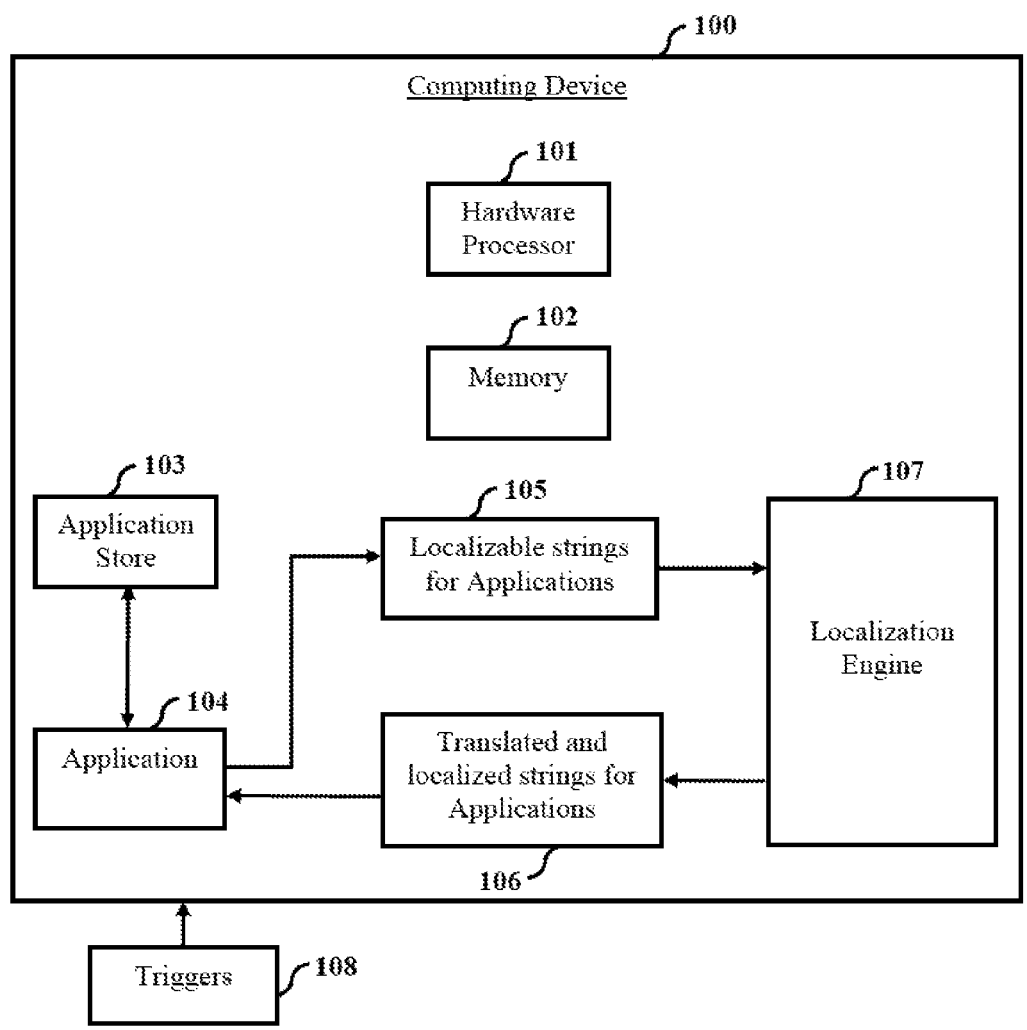
FIG. 1 illustrates a block diagram of the system that enables localization of digital content in computing, devices, according to an embodiment.

Although the specific features of the embodiments herein are shown in some drawings and not in others. This is done for convenience only as each feature may be combined with any or all of the other features in accordance with the embodiment herein.

DETAILED DESCRIPTION OF THE EMBODIMENTS HEREIN

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

In the following detailed description, a reference is made to the accompanying drawings that form a part hereof, and in which the specific embodiments that may be practiced is shown by way of illustration. The embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

The various embodiments herein provide a system and method for translation of static and dynamic content in digital applications. The embodiments also provide a system and method for automatic and contextual translation of static and dynamic content on digital applications based on user-defined triggers.

According to one embodiment herein, a system and method is provided to identify content for localization. The embodiment enables automatic localization of dynamic and static content of any application installed on a computing device. The embodiment also enables a method to trigger localization of content within an application based on input method used by the user. The localization of static and dynamic content of multiple versions of same application is also enabled depending on activation of preset user-defined triggers. The dynamic content includes dynamic strings that are generated during runtime by an application. The embodiment also enables localization of any string or content displayed on the computing device.

According to one embodiment herein, a localization engine is provided to localize content in digital applications. The localization engine is present on as computing device, on a server or as a distributed system that is present in parts on the device of a user and remaining parts on a server. The localization engine caches the commonly translated content on the device and stores information on a server. The localization is enabled to be performed in a single step or in multiple steps, where each step comprises only a part of the strings that are localized. In the case of dynamic strings, the localization is a continuous process that runs on the application.

According to one embodiment herein, a localization engine is provided for localization of digital content and enabling translation of content. The localization engine performs and manages all translations performed by the system. When a translation request is obtained at the localization engine, the translation is performed and the translated content is returned to the communication module that requested the translation. The communication module that request for translation are an application localization tool, an application store and a computing device. The application localization tool is a standalone tool that runs on a computing device and enables developers to localize their applications into specific languages. The application store server sends a localization request when the application store comprises applications that include content that is localized after the content is uploaded on the application. The device that runs the localization engine sends a localization request to the localization engine when the device runs an application that is set to a language, which is not a part of the localized strings comprised in the application. The localization engine comprises a human translation management module and an automated translation module. In the Automated Translation module fed text is translated automatically using a statistical machine learning module, which continuously improve automated translations by learning from the correct translations fed into it.

According to one embodiment herein, a method for identifying a plurality of triggers is provided to enable localization of digital content. The embodiment enables a computing device to identify triggers such as input methods, location of user, language of device etc., to activate a trigger for localization. Localization is not limited to localization of content and language, but includes services such as push notifications by applications and updates. Once a trigger is activated, all types of content such as dynamic, static, user generated etc, are localized and the system continues to localize content until another trigger is activated. Triggers also include displaying content or string that does not match the user's locale. The recognition of a trigger is enabled during not only the installation of an application, but also whenever a new localizable content is available in the application.

According to one embodiment herein, a method to automatically identify a plurality of triggers for localization digital content based on preset user-defined rules is provided. The multiple triggers that enable automatic localization of data include triggers such as history of user preferences, usage pattern of the user, input method, location of user etc. The embodiment also provides a ranking system that identifies a rank-based priority for localization of content based on usage pattern and information from user profile.

According to one embodiment herein, a system that enables automatic localization of digital content in computing devices is provided. The system comprises a Hardware Processor, a Memory, Application Store, Application, Device, Triggers and Localization Engine. An Application is retrieved from Application Store and installed in a computing Device. Preset Triggers are provided to the Device to determine when localization is to be done for translation of content in the Application. The Application transmits Localizable strings for Applications to the Localization Engine. The Localization Engine then transmits Translated and localized strings for Applications to the Application, to enable localization of content in the Device.

According to one embodiment herein, a method for localization of digital content in an application is provided. The process comprises following steps: Installation of application; Check when triggers for localization are available; when triggers are available, send message to the localization engine; when triggers are not available, then detect triggers; prompt the application about detected triggers; Check when any localized strings are available; when localized strings are not available, send message to localization engine; when localized strings are available, then prompt the localization engine and send strings; and, send notification along with translated or localized strings to application.

According to one embodiment herein, localization is enabled for an application installed on a computing device based on demand of the user. The application that is present in an application store or the localization tool enables a developer to localize application prior to uploading an application to the application store. Further, the localization engine manages versions of the application. When a translation is available to the application, the translation is provided to the user requesting for the translation. When translation is available for as past version of the application, is compared with strings of the past versions, and localization is provided based on the comparison of strings. When new strings are detected localization is provided by the human translation management module and the automated translation module.

According to one embodiment herein, an automated translation module is provided. The automated translation module is based on a statistical machine learning translation engine. The statistical machine learning translation engine generates translations on the basis of statistical models. A plurality of parameters for the translation is derived from an analysis of bilingual text corpora for every language pair of source language and target language of a translation. The statistical machine learning translation engine is initially loaded with a large corpora for a plurality of languages. When a new translation is performed through the human translation management system, the translated content is added into the appropriate language corpus. The statistical machine learning translation engine uses all the corpora to perform automated translations of any input text.

FIG. 1 illustrates a block diagram of the system that enables localization of digital content in computing devices. The system comprises a Hardware Processor 101, a Memory 102, Application Store 103, Application 104, Triggers 108 and Localization Engine 106. An Application 104 is retrieved from Application Store 103 and installed in a Computing Device 100. Preset Triggers 108 are provided to the Computing Device 100 to determine when localization is to be done. The Application 104 extracts and transmits Localizable strings for Applications 105 to the Localization Engine 107. The Localization Engine 107 then transmits Translated and localized strings for Applications 106 after repackaging into the Application 104 to enable localization of content in the Computing Device 100.

Figure 2:
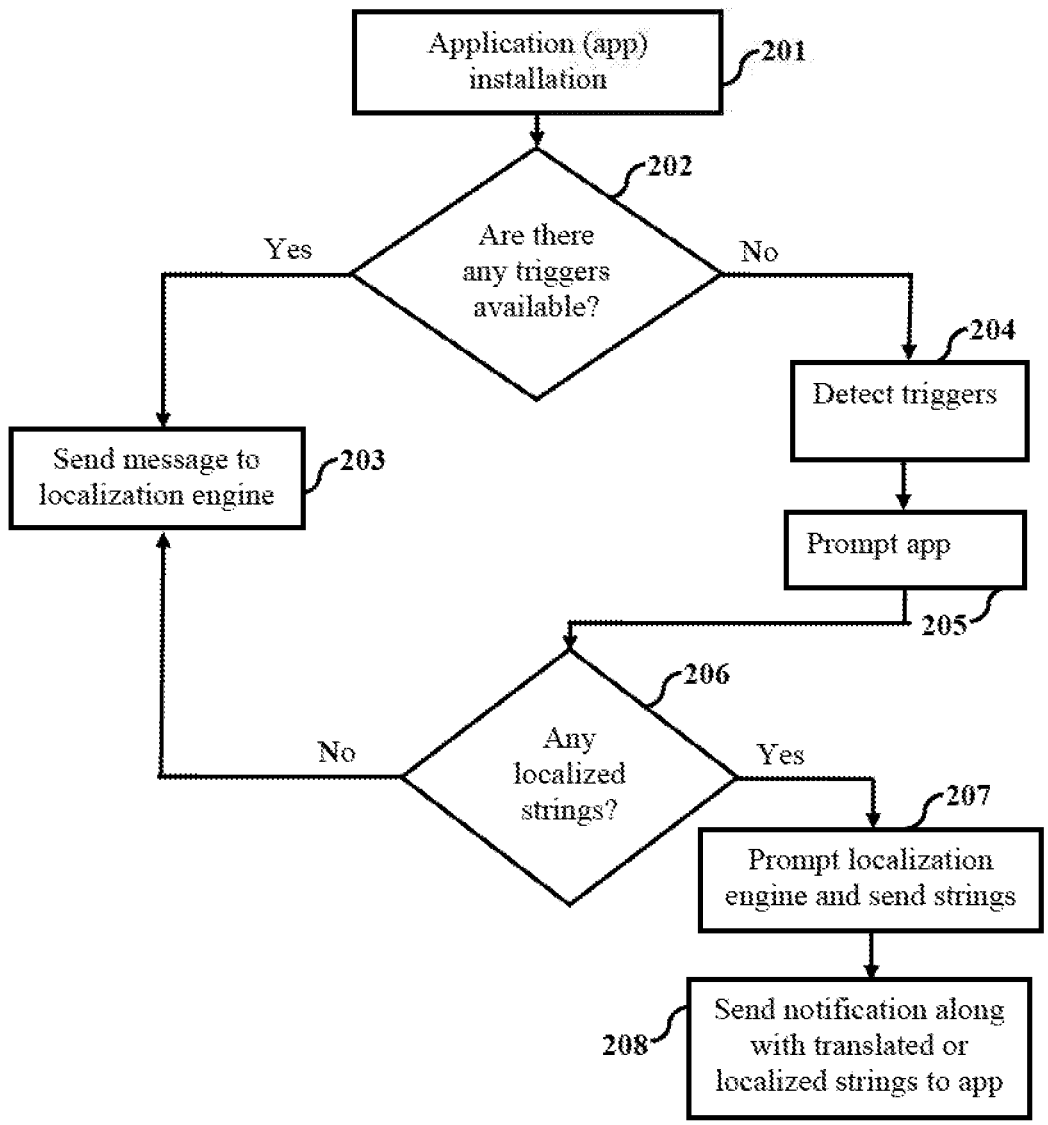
FIG. 2 herein illustrates a flow of processes involved in the localization of digital content in an application, according to an embodiment herein.

FIG. 2 illustrates a flow of processes involved in the localization of digital content in an application. The process comprises following steps: Installation of application (201); Check when triggers for localization are available (202); when triggers are available, send message to the localization engine (203); when triggers are not available, then detect triggers (204); prompt the application about detected triggers (205); Check when any localized strings are available (206); when localized strings are not available, send message to localization engine (203); when localized strings are available, then prompt the localization engine and send strings (207) and, send notification along with translated or localized strings to application (208).

The advantages of the embodiments disclosed herein comprise a system and method for contextual translation of static and dynamic content on digital applications based on user-defined triggers. The present embodiments provide a system for contextual translation of static and dynamic content on digital applications. The embodiments enable translation and localization of content based on multiple user-defined triggers such as history of user preferences, usage pattern of the user, input method, location of user etc. The embodiments also provide a rank-based priority for localization of content based on usage pattern and information from a user's profile.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

Although the embodiments herein are described with various specific embodiments, it will be obvious for a person skilled in the art to practice the invention with modifications. However, all such modifications are deemed to be within the scope of the appended claims.

It is also to be understood that the following claims are intended to cover all of the generic and specific features of the embodiments described herein and all the statements of the scope of the embodiments which as a matter of language might be said to fall there between.

What is claimed is:

1. A method for facilitating localized contextual translation of content displayed on a computing device executing a software application, in response to identifying at least one trigger during execution of the software application on the computing device, said method comprising the following computer implemented steps:

creating a plurality of triggers indicative of context of execution of the software application on the computing device and defining each of the triggers to indicate at: least one of location of the computing device, language of the computing device, input methods applicable the computing device, user profiles stored in the computing device and usage pattern of the computing device;

configuring each of said triggers to indicate, on activation, a demand for localization of the content displayed as a part of execution of the software application on the computing device;

embedding the triggers at predetermined portions of the software application to be executed on the computing device;

executing the software application on the computing device, and identifying at least one of the triggers during execution thereof, and activating identified trigger;

determining at least one of the location of the computing device, language of the computing device, input methods applicable to the computing device, and usage pattern of the computing device, based on the identified trigger;

invoking a localization engine response to activation of the identified trigger, and transmitting information corresponding to at least one of the location of the computing device, language of the computing device, input methods applicable to the computing device, user profiles stored in the computing device and usage pattern of the computing device, to the localization engine;

configuring the localization engine to analyze the information corresponding to at least one of the location of the computing device, language of the computing device, input methods applicable to the computing device, user profiles stored in the computing device and usage pattern of the computing device, and identify from the software application, the content to be translated; and, configuring the localization engine to translate identified content, in accordance with at least one of the location of the computing device, language of the computing device, input methods applicable to the computing device, user profiles stored in the computing device and usage pattern of the computing device.

2. The method as claimed in claim 1, wherein the step of configuring the localization engine to identify from the software application under execution, the content to be translated, further includes the step of configuring the localization engine to identify for translation dynamic content and static content corresponding to the software application under execution.

3. The method as claimed in claim 1, wherein the step of configuring the localization engine to identify from the software application, the content to be translated, further includes the step of determining a second language to which the content is to be translated, and determining said second language based on at least one of the location of the computing device, language of the computing device, input methods applicable to the computing device, and usage pattern of the computing device.

4. The method as claimed in claim 1, wherein the step of configuring the localization engine to translate identified content, further includes the step of configuring the localization engine to translate identified content using a statistical machine learning translation protocol.

5. The method as claimed in claim 1, wherein the step of configuring the localization engine to translate identified content, further includes the step of configuring the localization engine to translate at least textual content corresponding to the software application executed by the computing device.

* * * * *